US008564475B2

(12) United States Patent
Jung

(10) Patent No.: US 8,564,475 B2
(45) Date of Patent: Oct. 22, 2013

(54) APPARATUS AND METHOD FOR RAY-TRACING IN WIDEBAND GBYTE GBPS COMMUNICATION SYSTEM

(75) Inventor: Myoung Won Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 67 days.

(21) Appl. No.: 13/288,986

(22) Filed: Nov. 4, 2011

(65) Prior Publication Data

US 2012/0162005 A1 Jun. 28, 2012

(30) Foreign Application Priority Data

Dec. 23, 2010 (KR) ........................ 10-2010-0134043

(51) Int. Cl.

| | |
|---|---|
| ***G01S 13/00*** | (2006.01) |
| ***H04B 15/00*** | (2006.01) |
| ***H04B 7/00*** | (2006.01) |
| ***H04B 17/00*** | (2006.01) |
| ***H04B 1/10*** | (2006.01) |

(52) U.S. Cl.

USPC ........... 342/159; 342/59; 455/63.1; 455/66.1; 455/67.11; 455/67.13; 455/67.16; 455/296

(58) Field of Classification Search

USPC ........... 342/57, 179; 455/1, 63.1, 66.1, 67.11, 455/67.13, 67.16, 73, 296

See application file for complete search history.

(56) References Cited

U.S. PATENT DOCUMENTS

| | | | | |
|---|---|---|---|---|
| 4,449,127 | A * | 5/1984 | Sanchez | 342/80 |
| 4,472,718 | A * | 9/1984 | Ohashi et al. | 342/148 |
| 5,568,394 | A * | 10/1996 | Krikorian et al. | 702/189 |
| 5,694,131 | A * | 12/1997 | Baggett et al. | 342/148 |
| 6,005,510 | A * | 12/1999 | Maurice et al. | 342/45 |
| 6,525,685 | B1 * | 2/2003 | Rose | 342/148 |
| 7,358,891 | B2 * | 4/2008 | Struckman et al. | 342/156 |
| 7,427,945 | B2 * | 9/2008 | Stephens | 342/146 |
| 7,436,351 | B2 * | 10/2008 | Struckman et al. | 342/148 |
| 7,714,782 | B2 * | 5/2010 | Davis et al. | 342/377 |
| 2005/0195103 | A1 * | 9/2005 | Davis et al. | 342/99 |
| 2005/0225482 | A1 * | 10/2005 | Stephens | 342/191 |
| 2006/0273255 | A1 * | 12/2006 | Volkov et al. | 250/336.1 |
| 2007/0273576 | A1 * | 11/2007 | Struckman et al. | 342/156 |
| 2007/0285315 | A1 * | 12/2007 | Davis et al. | 342/377 |
| 2011/0298652 | A1 * | 12/2011 | Yanagihara et al. | 342/146 |
| 2011/0304498 | A1 * | 12/2011 | Yanagihara et al. | 342/70 |
| 2012/0162005 | A1 * | 6/2012 | Jung | 342/173 |

OTHER PUBLICATIONS

Thomas Kürner et al., "Propagation Models, Measurements and Simulations for Wireless Communication Systems Beyond 100 GHz", International Conference on Electromagnetics in Advanced Applications 2007, pp. 108-111, Sep. 2007.

Radoslaw Piesiewicz et al., "Scattering Analysis for the Modeling of THz Communication Systems", IEEE Transactions on Antennas and Propagation, vol. 55, No. 11, pp. 3002-3009, Nov. 2007.

* cited by examiner

*Primary Examiner* — Jack W Keith
*Assistant Examiner* — Peter Bythrow
(74) *Attorney, Agent, or Firm* — Rabin & Berdo, P.C.

(57) ABSTRACT

A method for ray-tracing in a wideband Gbyte Gbps communication system includes deriving scattering distribution characteristics of reflected signals reflected on a reflection plane, analyzing amplitude distribution of the scattering distribution characteristics to distinguish a specular signal and a diffuse signal, and comparing signal amplitudes of the specular signal and the diffuse signal to calculate received power of the reflected signals according to a result of the comparing.

12 Claims, 4 Drawing Sheets

TX RX R1 R2 n a b 3

APPARATUS AND METHOD FOR RAY-TRACING IN WIDEBAND GBYTE GBPS COMMUNICATION SYSTEM

CROSS-REFERENCE TO RELATED APPLICATIONS

The present application claims priority to Korean patent application number 10-2010-0134043, filed on Dec. 23, 2010, which is incorporated by reference in its entirety.

BACKGROUND OF THE INVENTION

The present invention relates to a wideband Gbyte Gbps communication system, and more particularly, to an apparatus and method for ray-tracing in a wideband Gbyte Gbps communication system which can improve accuracy of ray-tracing by considering physical characteristics of a reflection plane in the wideband Gbyte Gbps communication system.

For a conventional communication system, the maximum amount of data transfer is a few megabytes, and a data transfer rate of several Mbps is also sufficient. However, due to the recent trends for diversification, upgrading and enlarging content capacity, conventional communication systems are hard-pressed to cope with these trends, where data capacity of 1 Gbyte or more and high transfer rates of 1 Gbps or more are required.

In order to establish such communication system, development of communication systems and research on the frequency bands of millimeter waves or greater are currently in progress, and communication industries are now developing communication systems for 60 GHz and 70/80 GHz bands.

Conventionally, since the length of wavelength is very short in the case of a millimeter wave band signal, there are limitations in analyzing this signal with existing propagation models and estimation methods.

When a radio wave is transferred through a line of sight path, a propagation path of the radio wave maintains a direct path, and signal strength may be represented as an attenuation function of frequency depending on distance. When an obstacle exists between a transmitter and a receiver, a propagation path of a signal is determined by the sequence of transmitter-obstacle-receiver such that the signal strength arriving at the receiver is determined by factoring in a reflection coefficient, in which electrical characteristics of a medium of the obstacle are reflected, in a frequency function depending on distance.

At this time, the signal strength due to the obstacle is determined by multiplying the reflection coefficient, in which permittivity and conductivity, electrical characteristics of the medium of the obstacle, are reflected in the direction of a reflected angle having the same magnitude as an incident angle according to Snell's law (assuming that the surface of the obstacle is a smooth one) to an attenuation amplitude due to the propagation path.

However, if it could be assumed in conventional communication systems of a few hundred MHz and a few GHz that the reflection plane of the obstacle is smooth, when the frequency is increased to a few tens GHz or more, a wavelength of the signal will be shortened to a millimeter wave or less such that the obstacle can no longer be assumed to be smooth, as in the related art. This is because the radio waves react more sensitively on the surface of the reflection plane in the case of the millimeter wave band unlike in the conventional case.

FIG. 1 illustrates a diagram of a reflection path of a radio wave according to the Snell's law.

FIG. 1 illustrates a process in which the radio wave coming from a transmitter TX is transferred to a receiver RX after reflecting from an obstacle 3 according to the Snell's law.

When a signal started from the transmitter TX is reflected at the obstacle 3 to arrive at the receiver RX in a conventional ray-tracing method, the reflection occurs with the same magnitude of angle (<a=<b) as an incident angle (<a) on the basis of a normal vector n of a reflection plane. After multiplying a reflection coefficient (Γ) to a path loss as much as a length of an incident path $R_1$, a path loss as much as a length of a reflection path $R_2$ is transferred to the receiver RX as a signal amplitude.

However, since it is assumed that the obstacle is always in a state of a perfectly flat plane according to this method, there is a limitation to analyze frequency bands of the millimeter wave or more.

Because, although the surface of a wall looks smooth in a real environment, many tiny irregularities constitute a rough surface if we look at the surface of a wall more closely. Therefore, if the propagation path is transmitter-obstacle-receiver, there is a problem of increasing estimation errors when simply applying the Snell's law.

The foregoing technical configuration is only provided as a background technology for helping to understand the present invention and does not mean the related art widely known in the art to which the present invention pertains.

SUMMARY OF THE INVENTION

Embodiments of the present invention are directed to apparatus and method for ray-tracing in a wideband Gbyte Gbps communication system for improving accuracy of ray-tracing by distinguishing a specular signal and a diffuse signal using scattering distribution characteristics, and calculating power of reflected signals received at a receiver depending on amplitudes of the specular and diffuse signals.

In one embodiment, a method for ray-tracing in a wideband Gbyte Gbps communication system includes: deriving scattering distribution characteristics of reflected signals reflected on a reflection plane; analyzing amplitude distribution of the scattering distribution characteristics to distinguish a specular signal and a diffuse signal; and comparing signal amplitudes between the specular signal and the diffuse signal to calculate received power of the reflected signals according to a result of the comparing.

In another embodiment, the calculating of the received power of the reflected signals may include calculating the received power using only the specular signal when the signal amplitude of the diffuse signal is less than a multiplier factor of the signal amplitude of the specular signal as the result of the comparing.

In another embodiment, the calculating of the received power of the reflected signals may include calculating the received power by averaging powers of the total reflected signals when the signal amplitude of the diffuse signal is more than the multiplier factor of the signal amplitude of the specular signal as the result of the comparing.

In another embodiment, the multiplier factor may be ½.

In another embodiment, the distinguishing of the specular signal and the diffuse signal may include: extracting two reflected signals having largest signal amplitudes in the scattering distribution characteristics; and comparing the signal amplitudes of the two reflected signals having the largest signal amplitudes to distinguish a reflected signal having a large signal amplitude as the specular signal and a reflected signal having a small signal amplitude as the diffuse signal.

In another embodiment, an apparatus for ray-tracing in a wideband Gbyte Gbps communication system includes: a radio wave receiving part that receives reflected signals reflected from an obstacle; a scattering distribution characteristics analyzing part that analyzes scattering distribution characteristics of the reflected signals received from the radio wave receiving part; a reflected signal analyzing part that distinguishes a specular signal and a diffuse signal by analyzing the scattering distribution characteristics derived from the scattering distribution characteristics analyzing part; and a received power calculating part that compares signal amplitudes of the specular signal and the diffuse signal distinguished from the reflected signal analyzing part to calculate received power of the reflected signals according to a result of the comparing.

In still another embodiment, the received power calculating part may calculate the received power using only the specular signal when the signal amplitude of the diffuse signal is less than a multiplier factor of the signal amplitude of the specular signal.

In still another embodiment, the received power calculating part may calculate the received power by averaging powers of the total reflected signals if the signal amplitude of the diffuse signal is more than the multiplier factor of the signal amplitude of the specular signal.

In still another embodiment, the multiplier factor may be ½.

In still another embodiment, the reflected signal analyzing part may distinguish a reflected signal having a large signal amplitude as the specular signal and a reflected signal having a small signal amplitude as the diffuse signal among two reflected signals having largest signal amplitudes in the scattering distribution characteristics.

DESCRIPTION OF SPECIFIC EMBODIMENTS

Figure 1:
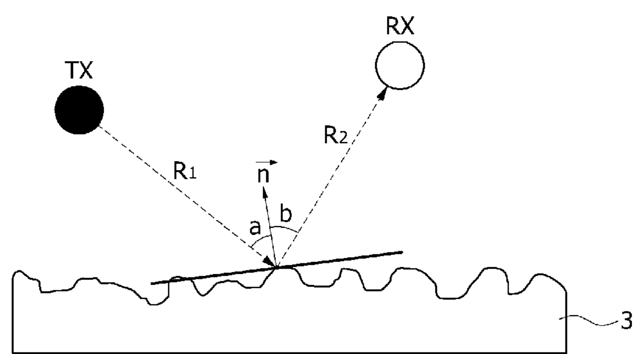
FIG. 1 illustrates a diagram of a reflection path of a radio wave according to the Snell's law.

Hereinafter, apparatus and method for ray-tracing in a wideband Gbyte Gbps communication system in accordance with the present invention will be described in detail with reference to the accompanying drawings. In the drawings, the thicknesses of lines or the sizes of elements may be exaggeratedly illustrated for clarity and convenience of description. Moreover, the terms used henceforth have been defined in consideration of the functions of the present invention, and may be altered according to the intent of a user or operator, or conventional practice. Therefore, the terms should be defined on the basis of the entire content of this specification.

Generally, if a signal started from a transmitter TX is assumed to be coming from an angle of approximately 120 degrees on the basis of horizontal direction of an obstacle, energy distribution of the signals reflected by a rough reflection plane of the obstacle shows characteristics in which the strongest signal is distributed in the direction of a 60 degree angle discharged from a right reflection plane and scattered signals are distributed in the whole region.

This only represents one example. Therefore, the characteristics of the energy distribution may be changed according to the heights of irregularities of the reflection plane of the obstacle, correlation between rough curvatures, magnitude of an incident angle.

The energy distribution at the reflection plane follows a principle of conservation of energy such that the signals, in which a loss as much as a reflection coefficient according to the electrical characteristics of a medium of the reflection plane is excluded, scatter into the whole region.

For example, when analyzing a reflection mechanism progressed in the sequence of a transmitter, an obstacle, and a receiver, if an incident signal having a magnitude of 1 is discharged, power with magnitude of approximately 0.7 is transferred to the receiver through a relation of power loss of approximately 0.3 by an obstacle medium when the incident signal started from the transmitter is transferred to the receiver after striking the obstacle assuming that the surface of the obstacle is a smooth plane.

Since the specular signal has a high energy and the diffuse signal has a low energy depending on the correlation between the height and the distance of rough surface when scattering amplitudes are small, appearance, in which scattered signals are excluded, shows a similar appearance to a reflection process by the general Snell's law.

However, the scattered signals have a high energy and the reflected signals have a low energy when the amplitudes of the scattered signal are large such that the overall appearance will be progressed with a shape having only the scattered signals.

Also, back-scattered signals will be strong according to the correlation between the height and the distance of the irregularities of the reflection plane and the curvature of the reflection plane of the obstacle, the overall appearance will be progressed with the shapes of forward reflected signals, reverse reflected signals and scattered signals unlike the first case.

Therefore, when a radio wave signal is transferred in the direction of transmitter-obstacle-receiver, the amplitude of the signal actually transferred to the receiver has to be calculated by considering a roughness characteristic of the reflection plane.

Figure 2:
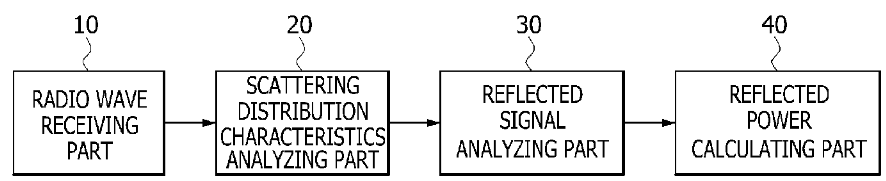
FIG. 2 illustrates a block diagram of an apparatus for ray-tracing in a wideband Gbyte Gbps communication system according to one embodiment of the present invention.

FIG. 2 illustrates a block diagram of an apparatus for ray-tracing in a wideband Gbyte Gbps communication system according to one embodiment of the present invention.

The apparatus for ray-tracing in the wideband Gbyte Gbps communication system according to one embodiment of the present invention includes a radio wave receiving part 10, a scattering distribution characteristics analyzing part 20, a reflected signal analyzing part 30, and a received power calculating part 40 as shown in FIG. 2.

The radio wave receiving part 10 receives reflected signals reflected from an obstacle 3. The radio wave receiving part 10 may be installed at various positions enabling to receive the reflected signals.

The scattering distribution characteristics analyzing part 20 analyzes scattering distribution characteristics of the reflected signals which are reflected from the obstacle 3 and received at the radio wave receiving part 10.

These scattering distribution characteristics may be distributed in variety from a region having strong signals to a region having low signals according to physical characteristics of the reflected plane, for example, correlation between height and curvature of rough portions of the reflected plane.

The reflected signal analyzing part 30 analyzes amplitude distribution of the scattering distribution characteristics analyzed in the scattering distribution characteristics analyzing part 20. At this time, two reflected signals, which have largest signal amplitudes in the scattering distribution characteristics, are extracted.

By comparing signal amplitudes of two reflected signals having the largest signal amplitudes, a reflected signal having a large signal amplitude is distinguished as a specular signal, and a reflected signal having a small signal amplitude is distinguished as a diffuse signal.

The received power calculating part 40 calculates received power of the reflected signals using the specular signal and the diffuse signal analyzed in the reflected signal analyzing part 30.

That is, the specular and diffuse signals are compared, and as a result of the comparison, if the signal amplitude of the diffuse signal is less than a multiplier factor, e.g., ½ of the signal amplitude of the specular signal, the received power of the reflected signals is calculated using only the specular signal.

On the other hand, if the signal amplitude of the diffuse signal is more than the multiplier factor of the amplitude of the specular signal, the received power of the reflected signals is calculated by averaging powers of the total reflected signals.

Hereinafter, a ray-tracing method of a wideband Gbyte Gbps communication system according to one embodiment of the present invention will be described in detail with reference to FIGS. 3 through 6.

Figure 3:
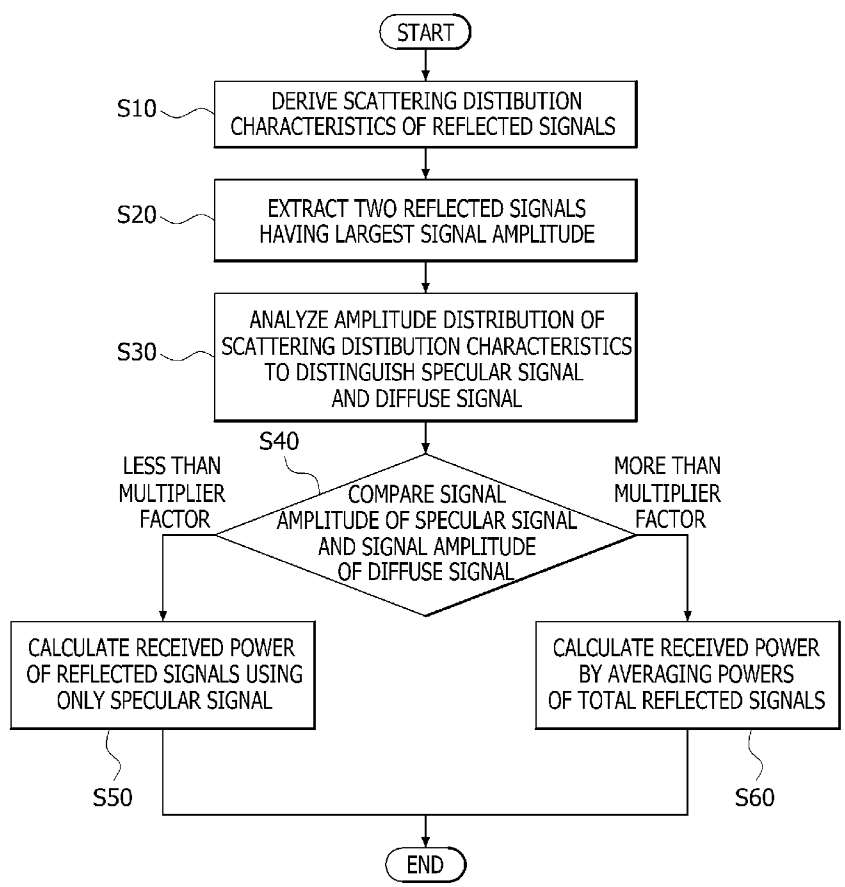
FIG. 3 illustrates a ray-tracing method in a wideband Gbyte Gbps communication system according to one embodiment of the present invention.
Figure 4:
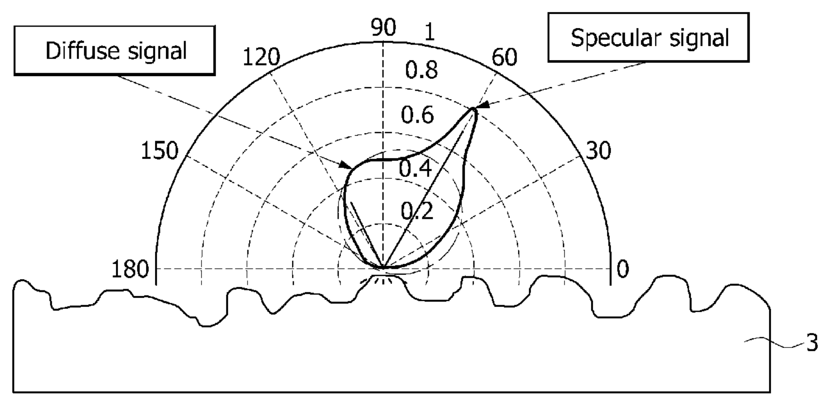
FIG. 4 illustrates a diagram of energy distribution of a specular signal according to one embodiment of the present invention.
Figure 5:
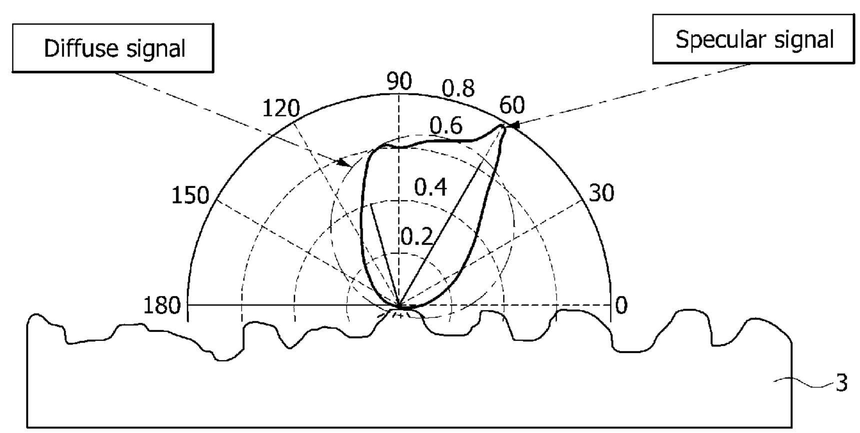
FIG. 5 illustrates a diagram of energy distribution of a diffuse signal according to one embodiment of the present invention.

FIG. 3 is a flowchart illustrating a ray-tracing method in a wideband Gbyte Gbps communication system according to one embodiment of the present invention, FIG. 4 illustrates a diagram of energy distribution of a specular signal according to one embodiment of the present invention, FIG. 5 illustrates a diagram of energy distribution of a diffuse signal according to one embodiment of the present invention.

First, in operation S10, a radio wave receiving part 10 receives reflected signals reflected from an obstacle 3, a scattering distribution characteristics analyzing part 20 derives scattering distribution characteristics.

In operation S20, when the scattering distribution characteristics are derived by the scattering distribution characteristics analyzing part 20, a reflected signal analyzing part 30 analyzes amplitude distribution from the scattering distribution characteristics to extract two reflected signals having largest signal amplitudes.

The reflected signal analyzing part 30 distinguishes a specular signal and a diffuse signal by comparing signal amplitudes in the two reflected signals having the largest signal amplitudes.

At this time, in operation S30, a reflected signal having a large signal amplitude is distinguished as a specular signal, and a reflected signal having a small signal amplitude is distinguished as a diffuse signal.

In operations S40 and S50, when the reflected signal analyzing part 30 distinguishes the specular signal and the diffuse signal, a received power calculating part 40 calculates received power of the reflected signals.

Figure 6:
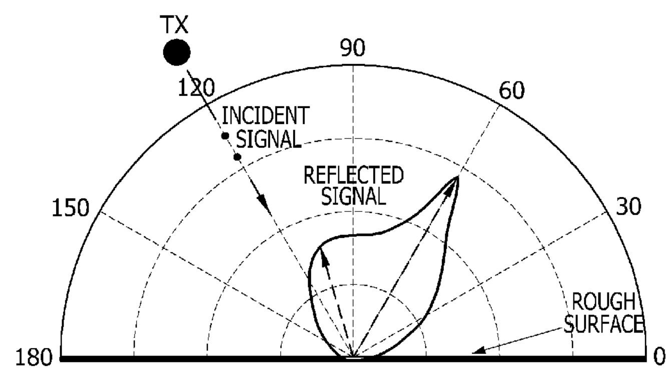
FIG. 6 illustrates a diagram of an example of calculating power of reflected signals according to one embodiment of the present invention.

That is, as shown in FIGS. 4 and 6, if a signal amplitude (0.4) of a reflected signal having no directionality, i.e., diffuse signal, is less than ½, a multiplier factor, of a signal amplitude (0.8) of a reflected signal having directionality, i.e., specular signal, a magnitude of the power is calculated using only reflected waves having directionality.

For example, when an incoming signal having an amplitude of 1 is incident at approximately 30 degrees, a specular signal is reflected at approximately 10 degrees, and surface loss of 0.3 and scattering loss of 0.2 are generated, a receiver calculates power of 0.5 through a calculation process of 1−(0.3+0.2).

On the other hand, as shown in FIG. 5, if the signal amplitude (0.6) of the reflected signal having no directionality, i.e., diffuse signal, is larger than ½, the multiplier factor, of the signal amplitude (0.8) of the reflected signal having directionality, i.e., specular signal, the received power is calculated by averaging powers of the reflected signals. This is because that the amplitude lost as much as the reflection loss from the rough surface of the obstacle is distributed to the overall scattered region according to the principle of conservation of energy.

In the present invention, physical characteristics of a reflection plane on which millimeter waves are reflected are considered such that accuracy of ray-tracing can be improved as compared to a ray-tracing method by the conventional Snell's law.

While the present invention has been described with respect to the specific embodiments, it will be apparent to those skilled in the art that various changes and modifications may be made without departing from the spirit and scope of the invention as defined in the following claims.

What is claimed is:

1. A method of ray-tracing in a wideband Gbyte Gbps communication system, the method comprising:

receiving, by a receiver of the wideband Gbyte Gbps communication system, radio wave signals that are transmitted by a transmitter and are reflected by a reflection plane of an obstacle;

deriving, by a scattering distribution characteristics analyzing part of the wideband Gbyte Gbps communication system, scattering distribution characteristics of the received reflected signals;

analyzing, by a reflected signal analyzing part of the wideband Gbyte Gbps communication system, amplitude distribution of the scattering distribution characteristics to recognize a specular signal and a diffuse signal from the received reflected signals; and comparing, by a received power calculating part of the wideband Gbyte Gbps communication system, signal amplitudes of the specular signal and the diffuse signal to calculate received power of the reflected signals according to a result of the comparing.

2. The method of claim 1, wherein the received power is calculated using only the specular signal when the signal amplitude of the diffuse signal is less than a multiplier factor of the signal amplitude of the specular signal as the result of the comparing.

3. The method of claim 2, wherein the multiplier factor is ½.

4. The method of claim 1, wherein the received power is calculated by averaging powers of the total reflected signals when the signal amplitude of the diffuse signal is more than a multiplier factor of the signal amplitude of the specular signal as the result of the comparing.

5. The method of claim 4, wherein the multiplier factor is ½.

6. The method of claim 1, wherein the recognition of the specular signal and the diffuse signal comprises:

extracting, from the received reflected signals, two reflected signals having largest signal amplitudes; and comparing the signal amplitudes of the two reflected signals, and recognizing one of the two reflected signals having a large signal amplitude as the specular signal and the other having a small signal amplitude as the diffuse signal.

7. An apparatus for ray-tracing in a wideband Gbyte Gbps communication system, the apparatus comprising:

a radio wave receiving part that receives reflected signals reflected from an obstacle;

a scattering distribution characteristics analyzing part that analyzes scattering distribution characteristics of the reflected signals received from the radio wave receiving part;

a reflected signal analyzing part that distinguishes a specular signal and a diffuse signal by analyzing the scattering distribution characteristics derived from the scattering distribution characteristics analyzing part; and a received power calculating part that compares signal amplitudes of the specular signal and the diffuse signal distinguished from the reflected signal analyzing part to calculate received power of the reflected signals according to a result of the comparing.

8. The apparatus of claim 7, wherein the received power calculating part calculates the received power using only the specular signal when the signal amplitude of the diffuse signal is less than a multiplier factor of the signal amplitude of the specular signal.

9. The apparatus of claim 8, wherein the multiplier factor is ½.

10. The apparatus of claim 7, wherein the received power calculating part calculates the received power by averaging powers of the total reflected signals if the signal amplitude of the diffuse signal is more than the multiplier factor of the signal amplitude of the specular signal.

11. The apparatus of claim 10, wherein the multiplier factor is ½.

12. The apparatus of claim 7, wherein the reflected signal analyzing part distinguishes a reflected signal having a large signal amplitude as the specular signal and a reflected signal having a small signal amplitude as the diffuse signal among two reflected signals having largest signal amplitudes in the scattering distribution characteristics.

* * * * *